(12) United States Patent
Zhao

(10) Patent No.: US 11,176,774 B2
(45) Date of Patent: Nov. 16, 2021

(54) GAME STAGE SWITCHING METHOD AND APPARATUS, AND STORAGE MEDIUM

(71) Applicant: SENSETIME INTERNATIONAL PTE. LTD., Singapore (SG)

(72) Inventor: Haiyu Zhao, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/852,441

(22) Filed: Apr. 18, 2020

(65) Prior Publication Data

US 2021/0192883 A1 Jun. 24, 2021

Related U.S. Application Data

(63) Continuation of application No. PCT/IB2020/052567, filed on Mar. 20, 2020.

(30) Foreign Application Priority Data

Dec. 23, 2019 (SG) .......................... 10201913030X

(51) Int. Cl.
*G07F 17/32* (2006.01)
*G06K 9/00* (2006.01)
*G06N 3/02* (2006.01)

(52) U.S. Cl.
CPC ....... *G07F 17/322* (2013.01); *G06K 9/00671* (2013.01); *G06N 3/02* (2013.01); *G07F 17/3223* (2013.01)

(58) Field of Classification Search
CPC .............. G07F 17/322; G07F 17/3223; G06K 9/00671; G06N 3/02
See application file for complete search history.

(56) References Cited

U.S. PATENT DOCUMENTS

| 2006/0252521 | A1 | 11/2006 | Gururajan et al. |
| 2007/0015583 | A1* | 1/2007 | Tran .................... G07F 17/3288 463/40 |
| 2012/0040727 | A1 | 2/2012 | Gururajan |
| 2015/0312517 | A1 | 10/2015 | Hoyt et al. |

(Continued)

FOREIGN PATENT DOCUMENTS

| JP | 2017202326 A | 11/2017 |
| KR | 20030064124 A | 7/2003 |
| KR | 20130114512 A | 10/2013 |

OTHER PUBLICATIONS

International Search Report and Written Opinion for Application No. PCT/IB2020/052567, dated Aug. 25, 2020, 9 pages.

(Continued)

*Primary Examiner* — Werner G Garner
(74) *Attorney, Agent, or Firm* — Sheppard Mullin Richter & Hampton LLP

(57) ABSTRACT

The present disclosure provides a game stage switching method and apparatus, and a storage medium. The method includes: obtaining a video stream of a game desktop; detecting a target object for each of image frames included in the video stream; and in response to detecting a specific target object in at least one image frame in the video stream, switching a game progress stage at a time point corresponding to a first image frame in a plurality of continuous image frames where the specific target object is detected.

17 Claims, 6 Drawing Sheets

(56) References Cited

U.S. PATENT DOCUMENTS

2017/0330414 A1 11/2017 Dallmeier
2019/0333327 A1 10/2019 Shigeta

OTHER PUBLICATIONS

Search Report and Written Opinion for Singapore Application No. 10201913030X, dated Feb. 4, 2020, 8 pages.
Office Action Issued in Korean Application No. 1020207012442, dated Dec. 21, 2020, 10 pages.
State Intellectual Property Office of the People's Republic of China, Office Action and Search Report Issued in Application No. 202080000526.3, dated Sep. 24, 2021, 15 pages.

* cited by examiner

GAME STAGE SWITCHING METHOD AND APPARATUS, AND STORAGE MEDIUM

CROSS REFERENCE TO RELATED APPLICATIONS

This application is a continuation of International Application No. PCT/IB2020/052567, filed on Mar. 20, 2020, which claims priority to Singaporean Patent Application No. 10201913030X entitled "GAME STAGE SWITCHING METHOD AND APPARATUS, AND STORAGE MEDIUM" and filed on Dec. 23, 2019, all of which are incorporated herein by reference in their entirety.

TECHNICAL FIELD

The present disclosure relates to the field of computer vision, particularly to a game stage switching method and apparatus, and a storage medium.

BACKGROUND

A game may have several progress stages. At present, a specific action is required to be performed by a dealer manually, or a specified button is required to be pressed by the dealer, to switch a game progress stage.

SUMMARY

The present disclosure provides a game stage switching method and apparatus, and a storage medium.

According to the first aspect of embodiments of the present disclosure, a game stage switching method is provided, the method includes: obtaining a video stream of a game desktop; detecting a target object for each of image frames included in the video stream; and in response to detecting a specific target object in at least one image frame in the video stream, switching a game progress stage at a time point corresponding to a first image frame in a plurality of continuous image frames where the specific target object is detected.

In some optional embodiments, the video stream includes video streams synchronously acquired from a plurality of views of the game desktop, and switching the game progress stage at the time point corresponding to the first image frame in the plurality of the continuous image frames where the specific target object is detected includes: determining the first image frame in the plurality of the continuous image frames where the specific target object is detected in a video stream from one view; determining a synchronous image acquired synchronously with the first image frame in a video stream synchronously acquired from other view; and in response to detecting the specific target object in at least one image frame of N image frames acquired before the synchronous image, switching the game progress stage at a time point corresponding to an image frame where the specific target object is detected earliest in the N image frames acquired before the synchronous image.

In some optional embodiments, the method further includes: in response to not detecting the specific target object in the N image frames acquired before the synchronous image, switching the game progress stage at the time point corresponding to the first image frame.

In some optional embodiments, the plurality of the views includes: a side view and a top view, wherein the side view comprises a left side view of the game desktop and/or a right side view of the game desktop.

In some optional embodiments, detecting a target object for each of image frames included in the video stream includes: for each image frame in the video stream, inputting the image frame into a neural network for target object detection to obtain a detection result, wherein the detection result indicates whether the image frame comprises the specific target object.

In some optional embodiments, the target object includes at least one of a person, a game chip, a game card, or a game currency.

In some optional embodiments, the specific game object comprises a game card, and switching the game progress stage at the time point corresponding to the first image frame in the plurality of the continuous image frames where the specific target object is detected includes: switching the game progress stage from a betting stage to a gaming stage at the time point corresponding to the first image frame in the plurality of the continuous image frames where the game card is detected.

In some optional embodiments, the method further includes: providing a prompt of stopping betting after switching from the betting stage to the gaming stage.

In some optional embodiments, the method further includes: in response to detecting a change in a betting chip in image frames of the gaming stage in the video stream, determining that the changed chip is an invalid chip and issuing warning information.

According to the second aspect of the embodiments of the present disclosure, a game stage switching apparatus is provided, the apparatus includes: a video stream obtaining module, configured to obtain a video stream of a game desktop; an object detection module, configured to detect a target object for each of image frames comprised in the video stream; and a game stage switching module, configured to, in response to detecting a specific target object in at least one image frame in the video stream, switch a game progress stage at a time point corresponding to a first image frame in a plurality of continuous image frames where the specific target object is detected.

In some optional embodiments, the video stream comprises video streams synchronously acquired from a plurality of views of the game desktop, and the game stage switching module includes: a first determining sub-module, configured to determine the first image frame in the plurality of the continuous image frames where the specific target object is detected in a video stream from one view; a second determining sub-module, configured to determine a synchronous image acquired synchronously with the first image frame in a video stream synchronously acquired from other view; and a first game stage switching sub-module, configured to, in response to detecting the specific target object in at least one image frame of N image frames acquired before the synchronous image, switch the game progress stage at a time point corresponding to an image frame where the specific target object is detected earliest in the N image frames acquired before the synchronous image.

In some optional embodiments, the first game stage switching sub-module is configured to: in response to not detecting the specific target object in the N image frames acquired before the synchronous image, switch the game progress stage at the time point corresponding to the first image frame.

In some optional embodiments, the plurality of the views includes: a side view and a top view, wherein the side view comprises a left side view of the game desktop and/or a right side view of the game desktop.

In some optional embodiments, the object detection module includes: an object detection sub-module, configured to, for each image frame in the video stream, input the image frame into a neural network for target object detection to obtain a detection result, wherein the detection result indicates whether the image frame comprises the specific target object.

In some optional embodiments, the target object includes at least one of a person, a game chip, a game card, or a game currency.

In some optional embodiments, the specific game object includes a game card, the game stage switching module includes: a second game stage switching sub-module, configured to switch the game progress stage from a betting stage to a gaming stage at the time point corresponding to the first image frame in the plurality of the continuous image frames where the game card is detected.

In some optional embodiments, the apparatus further includes: a prompting module, configured to provide a prompt of stopping betting after switching from the betting stage to the gaming stage.

In some optional embodiments, the apparatus further includes: a determining module, configured to, in response to detecting a change in a betting chip in image frames of the gaming stage in the video stream, determine that the changed chip is an invalid chip and issue warning information.

According to the third aspect of the embodiments of the present disclosure, a computer readable storage medium is provided, the storage medium has a computer program stored thereon, where computer program is configured to implement the game stage switching method according to any item of the first aspect.

According to the fourth aspect of the embodiments of the present disclosure, a game stage switching apparatus is provided, the apparatus includes: a processor; and a memory storing instructions executed by the processor; where the processor is configured to invoke the executable instructions stored in the memory, to implement the game stage switching method according to any item of the first aspect.

The technical solutions provided according to the embodiments of the present disclosure include the following beneficial effects:

In the embodiments of the present disclosure, a video stream of a game desktop is obtained; a target object is detected for each of image frames included in the video stream; and in a case that a specific target object is detected in at least one image frame in the video stream, a game progress stage is switched at a time point corresponding to a first image frame in a plurality of continuous image frames where the specific target object is detected. Through the process above, the game progress stage can automatically be switched based on detection on the video stream, the pace of the game is ensured, hardware costs may be saved, and the efficiency is improved.

It should be understood that the above general description and the following detailed description are merely exemplary and explanatory, and are not intended to limit the present application.

BRIEF DESCRIPTION OF THE DRAWINGS

The accompanying drawings, which are incorporated in and constitute a part of the present specification, illustrate embodiments consistent with the present disclosure and, together with the specification, serve to explain the principles of the present disclosure.

DETAILED DESCRIPTION OF THE EMBODIMENTS

Exemplified embodiments would be explained in detail herein, and examples thereof are represented in drawings. When the description relates to the drawings, unless otherwise indicated, the same number in different drawings represents the same or similar element. Implementations described in the following exemplified embodiments do not represent all implementations consistent with the present disclosure. On the contrary, they are only examples for apparatuses and methods consistent with same aspects of the present disclosure as detailed in the appended claims.

Terms used in the present disclosure merely aim at describing a specific embodiment rather than aiming at limitation of the present disclosure. Terms determined by "a", "the", and "said" in their singular form used in the present disclosure and the appended claims also aim at including a multiple form, unless other meanings are clearly represented in the context. It should also be understood that the term "and/or" used in herein refers to any or all possible combinations including one or more associated listed terms.

It should be understood that the present disclosure may use terms such as "first", "second", and "third" to describe information, but such information should not be limited to these terms. These terms are merely used for distinguishing the same type of pieces of information from one another. For example, in the case of not departing from the scope of the present disclosure, first information may also be referred to as second information; and similarly, the second information may also be referred to as the first information. Depending on the context, for example, the term "if" used herein may be explained as "when" or "upon", or "in response to a determination".

Embodiments of the present disclosure provide a game stage switching method, applied to an electronic device, where the electronic device may include cameras for acquiring video streams, and detection of a game stage is performed using the video streams acquired by the electronic device.

Figure 1:
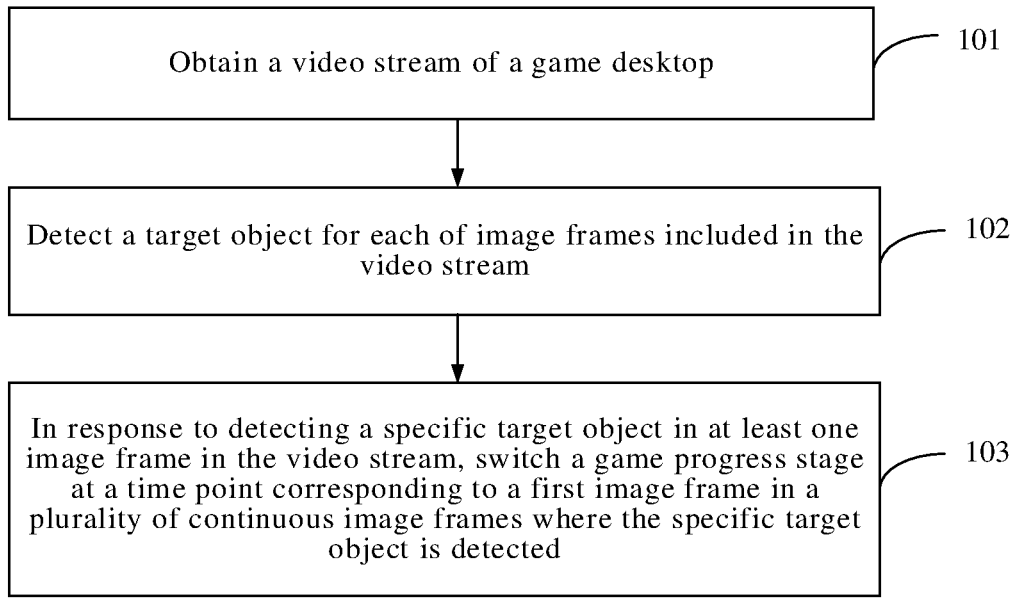
FIG. 1 is a flowchart of a game stage switching method according to an exemplary embodiment of the present disclosure.

FIG. 1 is a flowchart of a game stage switching method according to an exemplary embodiment. As shown in FIG. 1, the method includes the following steps.

At step 101, a video stream of a game desktop is obtained.

In an embodiment of the present disclosure, the video stream acquired from a view of the game desktop may be obtained. For example, the view may be a side view or a top view. In another embodiment of the present disclosure, to improve the accuracy of video stream analysis, video streams synchronously acquired from a plurality of views of the game desktop may be obtained. Optionally, the plurality of views includes a side view and a top view, where the side view includes a left side view of the game desktop and/or a right side view of the game desktop.

Figure 2:
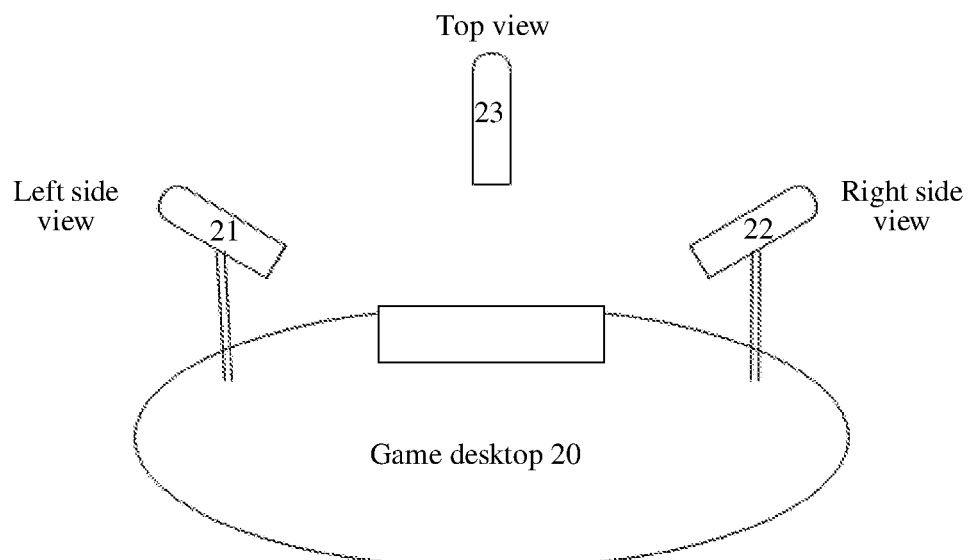
FIG. 2 is a schematic diagram of multi-view scene according to an exemplary embodiment of the present disclosure.

As shown in FIG. 2, the video stream at the left side view of the game desktop 20 is obtained by a left camera 21, the video stream at the right side view of the game desktop is obtained by a right camera 22, and the video stream at the top view is obtained by a middle camera 23.

At step 102, a target object is detected for each of image frames included in the video stream.

In the embodiments of the present disclosure, the target object includes, but not limited to, any one or a combination of: a person, a game chip, a game card, a game currency, or the like.

Each video stream includes a plurality of image frames. Each image frame is to detect whether there is a target object.

At step 103, in response to detecting a specific target object in at least one image frame in the video stream, a game progress stage is switched at a time point corresponding to a first image frame in a plurality of continuous image frames where the specific target object is detected.

In the embodiments of the present disclosure, the game progress stage may include a betting stage, a gaming stage, and a payout stage, and the specific target object may include a game card. The game progress stage may be switched to the gaming stage at the time point corresponding to the first image frame in the plurality of continuous image frames where the specific target object is detected.

In the embodiments, a video stream of a game desktop is obtained; a target object is detected for each image frame in the video stream; and in a case that a specific target object is detected in at least one image frame in the video stream, a game progress stage is switched at a time point corresponding to the first image frame in a plurality of continuous image frames where the specific target object is detected. Through the above process, the game progress stage can automatically be switched based on detecting the specific target object on the video stream, the pace of the game is ensured, hardware costs may be saved, the game time is saved, and the efficiency is improved.

Figure 3:
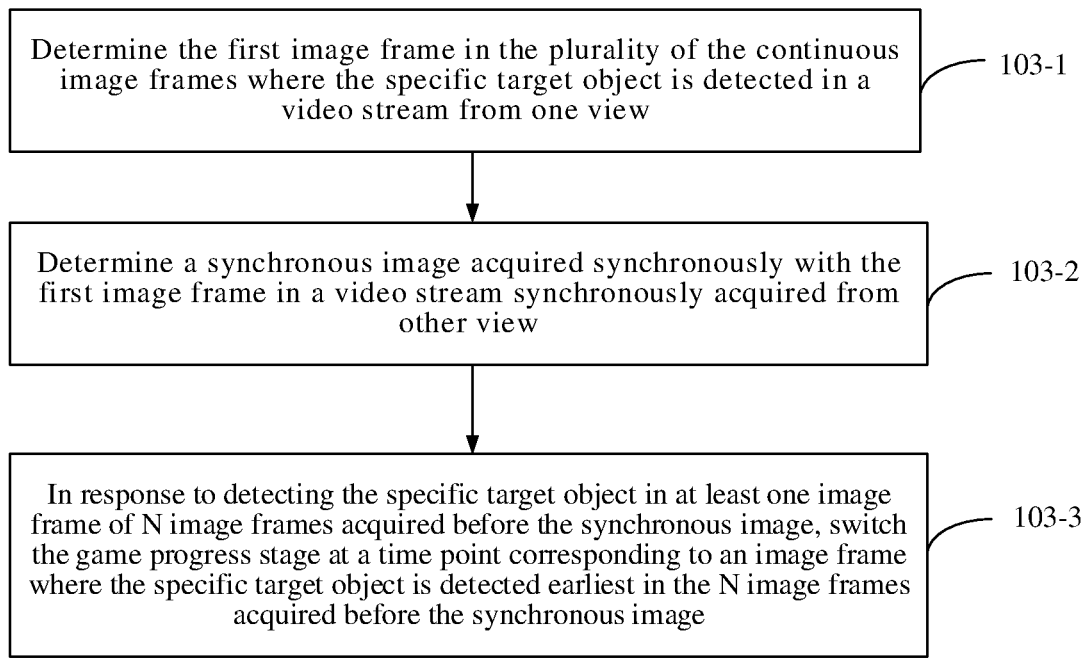
FIG. 3 is a flowchart of a game stage switching method according to another exemplary embodiment of the present disclosure.

In some optional embodiments, the video stream may include video streams synchronously acquired from the plurality of views of the game desktop. As shown in FIG. 3, the above step 103 may include the following steps.

At step 103-1, the first image frame in the plurality of the continuous image frames where the specific target object is detected is determined in a video stream from one view.

It should be noted that since a game may be played for a plurality of rounds, the video streams may include video streams acquired from the plurality of views in each round. To distinguish each round, a plurality of image frames where the specific target object is continuously acquired is recognized as images of one round, and therefore, the first image frame in the plurality of image frames where the specific target object is detected is respectively obtained from the video stream of each view.

If the plurality of views includes a side view and a top view, and the side view includes a left side view of the game desktop and/or a right side view of the game desktop, in the video stream from each view, for example, the video stream from the right side view of the game desktop, the left side view of the game desktop, or the top view, the first image frame in the plurality of continuous image frames where the specific target object is detected is respectively determined. It may be assumed that the first image frame in the plurality of continuous image frames where the specific target object from the first view (such as the left side view of the game desktop) in a certain round is image a.

At step 103-2, a synchronous image acquired synchronously with the first image frame is determined in a video stream synchronously acquired from other view.

For example, when the current one view is the left side view of the game desktop, and there is one or more other views, assuming that the other view includes the right side view of the game desktop and/or the top view of the game desktop, the first image frames corresponding to the left side view of the game desktop, e.g., the synchronous images synchronously acquired with image a, are determined in the video streams synchronously acquired from the other view. Correspondingly, the number of the synchronous images may also be one or more.

At step 103-3, in response to detecting the specific target object in at least one image frame of N image frames acquired before the synchronous image, the game progress stage is switched at a time point corresponding to an image frame where the specific target object is detected earliest in the N image frames acquired before the synchronous image.

In the embodiments of the present disclosure, in each round of the game, the specific target object may be detected in the video streams synchronously acquired from the plurality of views. To distinguish each round of the game during switching the game progress stage, and avoid using a time point where the specific target object is detected in the last round of the game as the time point for switching the game progress stage in the present round of the game, the value range of N can be limited. For example, N may be determined according to the average duration of a round of the game, the average duration of each game progress stage, and an image sample frequency, so as to ensure that the N image frames before the synchronous image belong to the same round of the game. N may be greater than or equal to 1, and less than or equal to 30.

The above is only an example to illustrate the value range of N, which may be limited in the same round of the game, and is limited according to the game time. The value range of N is not limited in the present disclosure.

Assuming that the first image frame from the left side view of the game desktop is image a, the synchronous image synchronously acquired at the top view with image a is image b, and the target object can also be detected in at least one image frame in the N image frames before image b, it can be considered that the specific target object is occluded during a period of time before image a is acquired from the left side view of the game desktop, resulting in that the earliest time point, when the target object appears, determined in the images acquired from the left side view of the game desktop in the present round of the game is incorrect. Thus, the game progress stage is switched at the earliest time point corresponding to the image frame where the target object is detected in the N image frames before image b in the images acquired from the top view.

If the view streams are acquired from three or more views, the synchronous images of the first image frame are required to be found from each of the views. If it is determined that the specific target object is detected in at least one image frame in N image frames before the synchronous images from at least two of the views, time points corresponding to the images where the target object is firstly detected in the N image frames before the synchronous images from the at least two of the views are determined respectively, the earliest time point can be found in the time points, and the game progress stage is switched at the earliest time point, so that the game progress stage is switched at the earliest time point when the specific target object appears in a round of the game. Therefore, it is more accurate to determine a game progress stage according to video streams acquired from a plurality of views, than according to a video stream acquired from a single view.

In the embodiments, in a case that the video stream includes video streams synchronously acquired from a plurality of views of the game desktop, a time point for switching a game progress stage is determined quickly, and each round of the game is distinguished, so that the accuracy of switching the game progress stage is improved.

Figure 4:
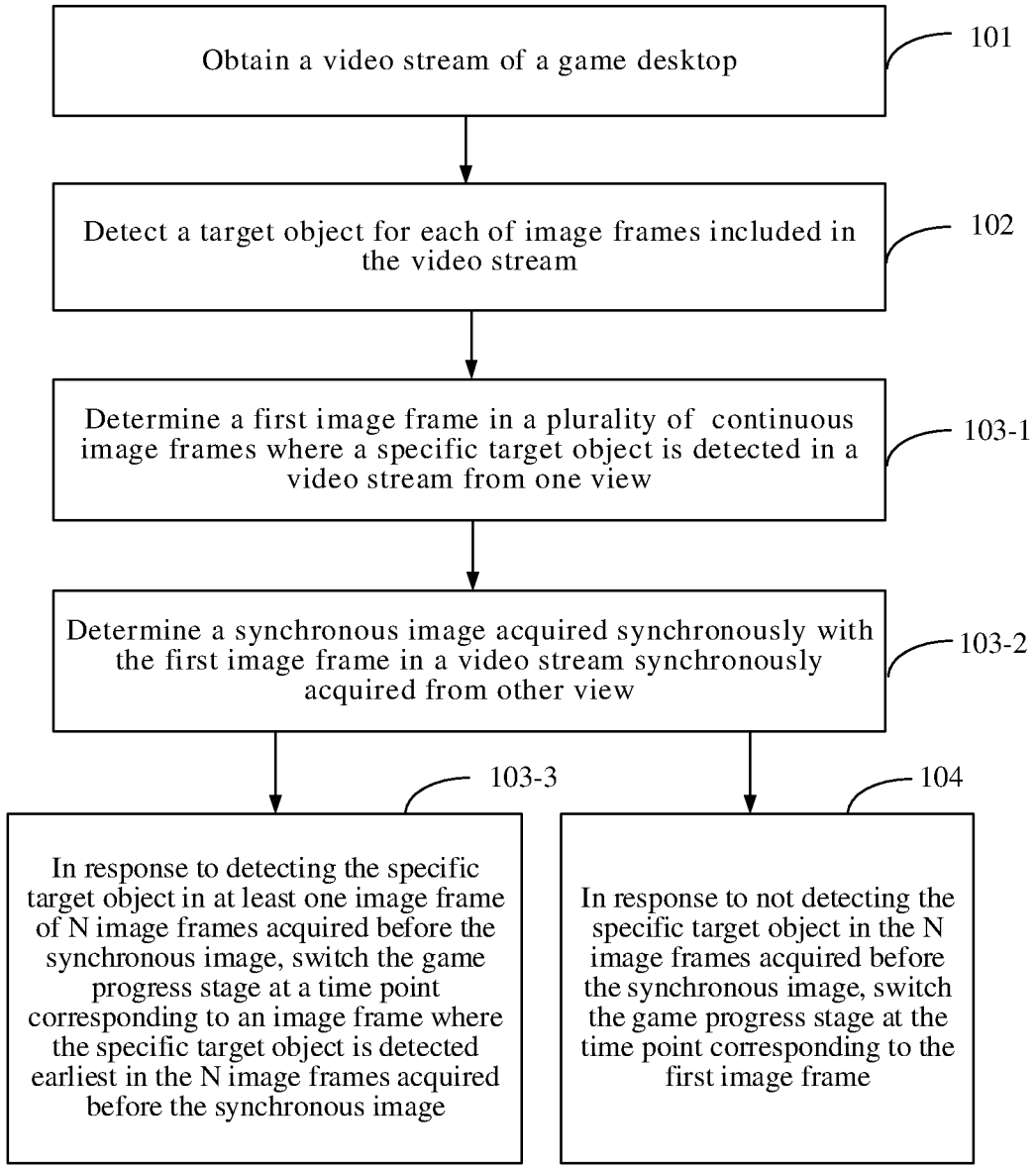
FIG. 4 is a flowchart of a game stage switching method according to still another exemplary embodiment of the present disclosure.

In some optional embodiments, as shown in FIG. 4, the method may further include:

at step 104, in response to not detecting the specific target object in the N image frames acquired before the synchronous image, switching the game progress stage at the time point corresponding to the first image frame.

In the embodiments of the present disclosure, if the specific target object is not detected in each of the N image frames before the synchronous images from different views, it indicates that in the present round of the game, the time point when the specific target object first appears is the time point corresponding to the first image frame, and therefore, the time point corresponding to the first image frame is used as the time point for switching the game progress stage.

In some optional embodiments, step 102 may include:

for each image frame in the video stream, inputting the image frame into a neural network for target object detection to obtain a detection result, where the detection result indicates whether the image frame includes the specific target object.

In the embodiments of the present disclosure, a neural network for target object detection may be pre-established. The neural network may adopt deep learning Faster Region Proposal Networks Convolutional Neural Networks (RCNN). In a training process, a plurality of sample image frames with annotations are used as input of the neural network, where the plurality of sample images may respectively include at least one of the target objects, and output of the neural network is an object detection result for each sample image frame. According to a target object truth value (e.g., the annotation) on the plurality of sample image frames, network parameters of the neural network are adjusted, so that a loss function is minimized, and the neural network for target object detection is trained.

Upon obtaining the video streams from the plurality of views of the game desktop, the video streams are input into the trained neural network for target object detection, so that the neural network for target object detection outputs the detection result in real time. The detection result indicates whether the specific target object is included in each image frame of the view streams. In the embodiments of the present disclosure, the target object may include, but not limited to, at least one of: a person, a game chip, a game card, a game currency, or the like. The specific target object may include a game card.

In the embodiments, the neural network for target object detection is used to detect whether the specific target object is included in each image frame of the video stream, so as to perform subsequent switching the game progress stage.

In some optional embodiments, the specific target object includes a game card, and step 103 includes: switching the game progress stage from a betting stage to a gaming stage at the time point corresponding to the first image frame in the plurality of the continuous image frames where the game card is detected.

In the embodiments of the present disclosure, if the game card is detected in the plurality of the continuous image frames in the video stream, it indicates that the present round of the game enters the gaming stage. Therefore, the time point corresponding to the first image frame in the plurality of the continuous image frames where the game card is detected is the time point for switching the game progress stage from the betting stage to the gaming stage.

In the embodiments, the game progress stage is automatically switched from the betting stage to the gaming stage at the time point corresponding to the first image frame in the plurality of continuous image frames where the game card is detected, so that the hardware costs are saved, and the efficiency is improved.

Figure 5:
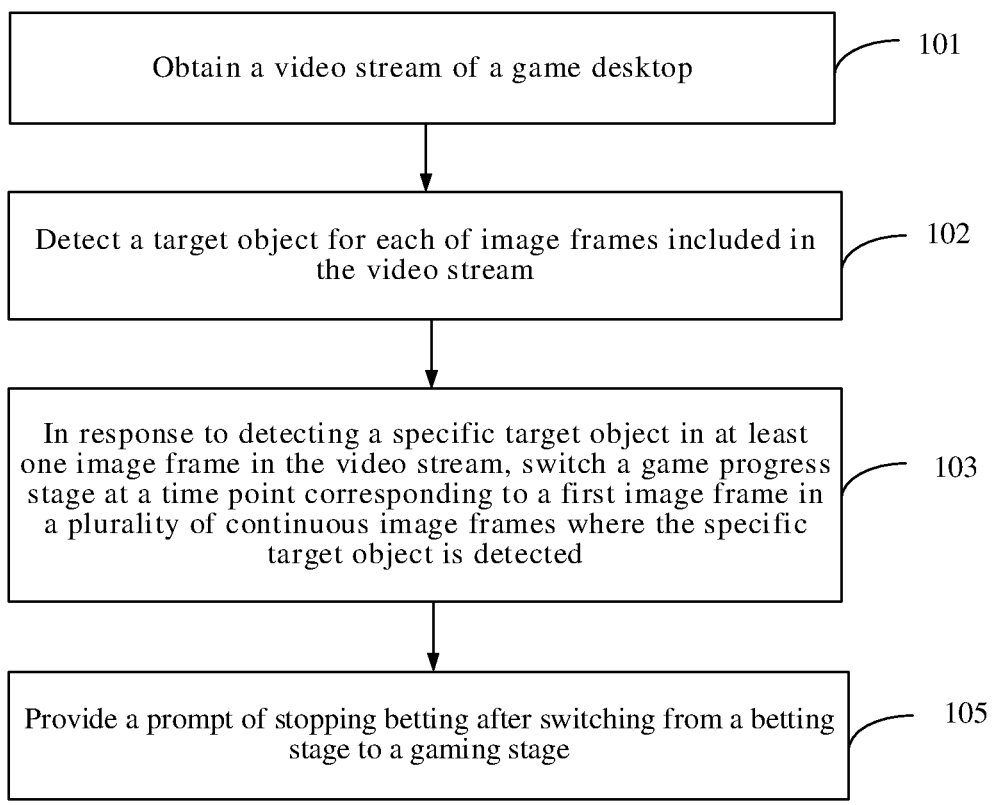
FIG. 5 is a flowchart of a game stage switching method according to yet another exemplary embodiment of the present disclosure.

In some optional embodiments, as shown in FIG. 5, the method may further include:

at step 105, providing a prompt of stopping betting after switching from the betting stage to the gaming stage.

In the embodiments of the present disclosure, the prompt of stopping betting may be provided as a voice prompt after switching from the betting stage to the gaming stage.

Figure 6:
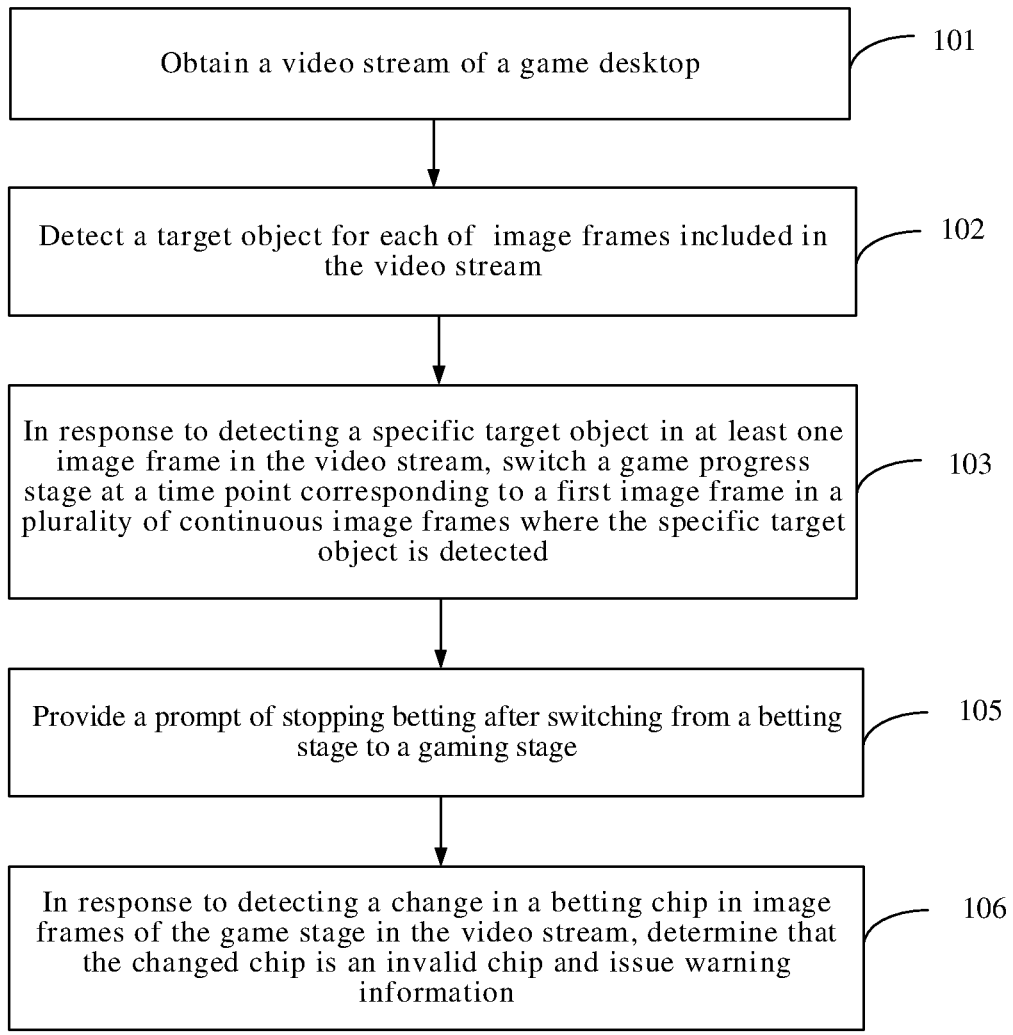
FIG. 6 is a flowchart of a game stage switching method according to yet another exemplary embodiment of the present disclosure.

In some optional embodiments, as shown in FIG. 6, the method may further include:

at step 106, in response to detecting a change in a betting chip in image frames of the gaming stage in the video stream, it is determined that the changed chip is an invalid chip and warning information is issued.

In the embodiments of the present disclosure, in each round of the game, after the switching from the betting stage to the gaming stage, if a change in the betting chip is detected in the images of the gaming stage, for example, a certain player adds a betting chip, it is determined that the changed chip is the invalid chip. In the embodiments of the present disclosure, if a certain player adds a chip, according to rules of the game, it may be determined that the chip added by the player after entering the gaming stage is the invalid chip, or it may be determined that all the chips of the player are the invalid chips, which is not limited in the present disclosure.

Furthermore, the warning information may be issued while the invalid chip is determined, for example, a warning is provided by voice, so as to ensure the fairness of the game.

In some optional embodiments, the game stage switching method can be applied to an intelligent game. When switching from the betting stage to the gaming stage, there is no need to perform a specific action or press a specified button by a dealer. Based on the video stream analysis, the betting stage is automatically switched to the gaming stage, where the video stream may include video streams synchronously acquired from a plurality of views of the game desktop.

The first image frame in the plurality of the continuous image frames where the specific target object is detected is firstly determined in the video stream from one view, and the synchronous image acquired synchronously with the first image frame is determined in the video stream synchronously acquired from the other view. If the specific target object, for example, a game card, is detected in at least one image frame of N image frames acquired before the synchronous image, the game progress stage is switched from the betting stage to the gaming stage at the time point corresponding to the image where the specific target object is detected earliest in the N image frames acquired before the synchronous image.

If the specific target object is not detected in the N image frames acquired before the synchronous image, the game progress stage is directly switched from the betting stage to the gaming stage at the time point corresponding to the first image frame.

In addition, in the embodiments of the present disclosure, during the switching from the betting stage to the game stage, a prompt of no more bet (common no-more-bet detection in existing games) may be automatically provided. In addition, in the video streams, if a change in the betting chip in the images of the gaming stage occurs, warning for late bet detection (performing betting after a game card is issued during the gaming stage, which is an irregular betting mode) is automatically issued, and it is determined that the changed chip is the invalid chip. In this way, labor costs are saved, the game efficiency is improved, and the negligence of human monitoring is avoided.

Corresponding to the method embodiments above, the present disclosure further provides apparatus embodiments.

Figure 7:
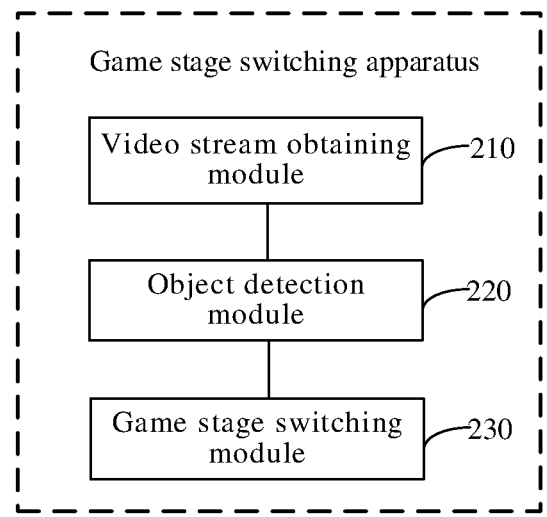
FIG. 7 is a block diagram of a game stage switching apparatus according to an exemplary embodiment of the present disclosure.

FIG. 7 is a block diagram of a game stage switching apparatus according to an exemplary embodiment of the present disclosure. As shown in FIG. 7, the apparatus includes: a video stream obtaining module 210, configured to obtain a video stream of a game desktop; an object detection module 220, configured to detect a target object for each of image frames comprised in the video stream; and a game stage switching module 230, configured to, in response to detecting a specific target object in at least one image frame in the video stream, switch a game progress stage at a time point corresponding to a first image frame in a plurality of continuous image frames where the specific target object is detected.

In some optional embodiments, the video stream comprise video streams synchronously acquired from a plurality of views of the game desktop, and the game stage switching module includes: a first determining sub-module, configured to determine the first image frame in the plurality of the continuous image frames where the specific target object is detected in a video stream from one view; a second determining sub-module, configured to determine a synchronous image acquired synchronously with the first image frame in a video stream synchronously acquired from other view; and a first game stage switching sub-module, configured to, in response to detecting the specific target object in at least one image frame of N image frames acquired before the synchronous image, switch the game progress stage at a time point corresponding to an image frame where the specific target object is detected earliest in the N image frames acquired before the synchronous image.

In some optional embodiments, the first game stage switching sub-module is configured to: in response to not detecting the specific target object in the N image frames acquired before the synchronous image, switch the game progress stage at the time point corresponding to the first image frame.

In some optional embodiments, the plurality of the views includes: a side view and a top view, where the side view includes a left side view of the game desktop and/or a right side view of the game desktop.

In some optional embodiments, the object detection module includes: an object detection sub-module, configured to, for each image frame in the video stream, input the image frame into a neural network for target object detection to obtain a detection result, wherein the detection result indicates whether the image frame comprises the specific target object.

In some optional embodiments, the target object includes at least one of a person, a game chip, a game card, or a game currency.

In some optional embodiments, the specific game object includes a game card, the game stage switching module includes: a second game stage switching sub-module, configured to switch the game progress stage from a betting stage to a gaming stage at the time point corresponding to the first image frame in the plurality of the continuous image frames where the game card is detected.

In some optional embodiments, the apparatus further includes: a prompting module, configured to provide a prompt of stopping betting after switching from the betting stage to the gaming stage.

In some optional embodiments, the apparatus further includes: a determining module, configured to, in response to detecting a change in a betting chip in image frames of the gaming stage in the video stream, determine that the changed chip is an invalid chip and issue warning information.

The apparatus embodiments correspond to the method embodiments substantially, and for the associated part, refer to the descriptions of the method embodiments. The apparatus embodiments described above are merely exemplary. The units described as separate parts may or may not be physically separate, and the parts displayed as units may or may not be physical units, e.g., may be located at one position, or may be distributed on a plurality of network units. A part of or all of the modules may be selected according to actual needs to achieve the objectives of the solutions of the present disclosure. A person having ordinary skill in the art can understand and implement them without involving an inventive effort.

Embodiments of the present disclosure further provide a computer readable storage medium, having a computer program stored thereon, where computer program is configured to implement the game stage switching method according to any one of the foregoing embodiments.

In some optional embodiments, embodiments of the present disclosure further provide a computer program product provided, including computer readable codes, where when the computer readable codes run in a device, cause a processor in the device to implement the game stage switching method according to any one of the foregoing embodiments.

In some optional embodiments, the embodiments of the present disclosure also provide a computer program product configured to store computer readable instructions, where when the instructions are executed, a computer executes the operations of the game stage switching method in any one of the foregoing embodiments.

The computer program product may be implemented by hardware, software, or a combination thereof. In one optional embodiment, the computer program product is specifically represented by a computer storage medium. In another optional embodiment, the computer program product is represented by a software product, such as Software Development Kit (SDK).

The embodiments of the present disclosure further provide a game stage switching apparatus, the apparatus includes a processor, and a memory storing instructions executed by the processor; where the processor is configured to invoke the executable instructions stored in the memory, to implement the game stage switching method according to any one of the foregoing embodiments.

Figure 8:
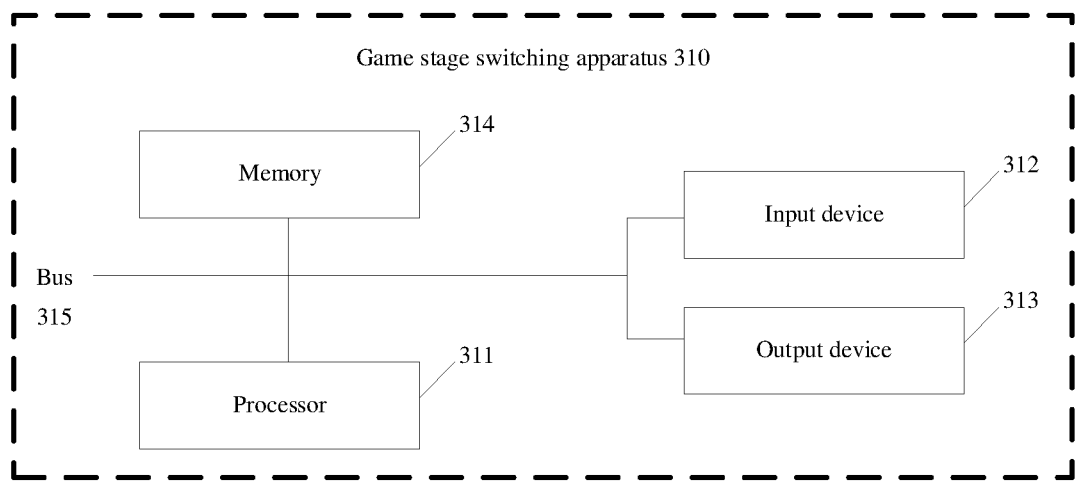
FIG. 8 is a schematic structural diagram of a game stage switching apparatus according to an exemplary embodiment of the present disclosure.

FIG. 8 is a schematic structural diagram of a game stage switching apparatus according to the embodiments of the present application. A game stage switching apparatus 310 includes a processor 311, and a memory 314. The game stage switching apparatus 310 may further include an input device 312 an output device 313, and a bus 315. The input device 312, the output device 313, the memory 314, and the processor 311 are interconnected by the bus 315.

The memory includes, but is not limited to, a Random Access Memory (RAM), a Read-Only Memory (ROM), an Erasable Programmable Read Only Memory (EPROM), or a Compact Disc Read-Only Memory (CD-ROM), and is used for storing related instructions and data.

The input device may be used to input data and/or signals, and the output device may be used to output data and/or signals. The output device and the input device may be independent devices, or may be an integrated device.

The processor may include one or more processors, for example, including one or more Central Processing Units (CPUs). If the processor is one CPU, the CPU may be a single-core CPU or a multi-core CPU.

The memory is configured to store program codes and data of the game stage switching apparatus.

The processor is configured to invoke the program codes and data in the memory to execute the steps in the method embodiments above. Please refer to the descriptions in the foregoing method embodiments for details, and details are not described here again.

It can be understood that FIG. 8 merely illustrates a simplified design of a game stage switching apparatus. In actual applications, a game stage switching apparatus may further includes other elements, including, but not limited to, any number of input/output devices, processors, controllers, memories, etc. Any descriptions that can achieve the game stage switching apparatus in the embodiments of the present application should all be included within the scope of protection of the present application.

After considering the specification and practice of the present disclosure, other implementations of the present disclosure could apparent to those skilled in the art. The present disclosure aims at covering any modification, usage or adaptive variation of the present disclosure, and the modification, usage or adaptive variation conforms to the general principles of the present disclosure and include common knowledge or conventional technical measures in the technical field not disclosed in the present disclosure. The specification and the embodiments are merely considered as exemplary only, and the real scope and spirit of the present disclosure are specified in the following claims.

The above descriptions are merely preferred embodiments of the present disclosure and are not intended to limit the present disclosure. Any modification, equivalent replacement, or improvement made within the spirit and principle of the present disclosure shall fall within the scope of protection of the present disclosure.

The invention claimed is:

1. A game stage switching method, comprising:
obtaining a video stream of a game desktop, wherein the video stream comprises video streams synchronously acquired from a plurality of views of the game desktop;
detecting a specific target object for each of image frames comprised in the video stream; and
in response to detecting the specific target object in at least one image frame in the video stream, switching a game progress stage at a time point corresponding to a first image frame in a plurality of continuous image frames where the specific target object is detected,
wherein switching the game progress stage at the time point corresponding to the first image frame in the plurality of the continuous image frames where the specific target object is detected comprises:
determining the first image frame in the plurality of the continuous image frames where the specific target object is detected in a video stream from one view;
determining a synchronous image acquired synchronously with the first image frame in a video stream synchronously acquired from another view; and
in response to detecting the specific target object in at least one image frame of N image frames acquired before the synchronous image, switching the game progress stage at a time point corresponding to an image frame where the specific target object is detected earliest in the N image frames acquired before the synchronous image.

2. The method according to claim 1, further comprising:
in response to not detecting the specific target object in the N image frames acquired before the synchronous image, switching the game progress stage at the time point corresponding to the first image frame.

3. The method according to claim 1, wherein the plurality of the views comprises:
a side view and a top view, wherein the side view comprises a left side view of the game desktop and/or a right side view of the game desktop.

4. The method according to claim 1, wherein detecting the specific target object for each of the image frames comprised in the video stream comprises:
for each image frame in the video stream, inputting the image frame into a neural network for target object detection to obtain a detection result, wherein the detection result indicates whether each of the image frames comprises the specific target object.

5. The method according to claim 1, wherein the specific target object comprises at least one of a person, a game chip, a game card, or a game currency.

6. The method according to claim 1, wherein the specific target object comprises a game card, and switching the game progress stage at the time point corresponding to the first image frame in the plurality of the continuous image frames where the specific target object is detected comprises:
switching the game progress stage from a betting stage to a gaming stage at the time point corresponding to the first image frame in the plurality of the continuous image frames where the game card is detected.

7. The method according to claim 6, further comprising:
providing a prompt of stopping betting after switching from the betting stage to the gaming stage.

8. The method according to claim 6, further comprising:
in response to detecting a change in a betting chip in image frames of the gaming stage in the video stream, determining that the changed betting chip is an invalid betting chip and issuing warning information.

9. A non-transitory computer readable storage medium, having a computer program stored thereon, wherein the computer program is configured to:
obtain a video stream of a game desktop, wherein the video stream comprises video streams synchronously acquired from a plurality of views of the game desktop;
detect a specific target object for each of image frames comprised in the video stream; and
in response to detecting the specific target object in at least one image frame in the video stream, switch a game progress stage at a time point corresponding to a first image frame in a plurality of continuous image frames where the specific target object is detected, wherein the game progress is switched by:

determining the first image frame in the plurality of the continuous image frames where the specific target object is detected in a video stream from one view;

determining a synchronous image acquired synchronously with the first image frame in a video stream synchronously acquired from another view; and in response to detecting the specific target object in at least one image frame of N image frames acquired before the synchronous image, switching the game progress stage at a time point corresponding to an image frame where the specific target object is detected earliest in the N image frames acquired before the synchronous image.

10. A game stage switching apparatus, comprising:
a processor; and
a memory storing instructions executed by the processor;
wherein the processor is configured to:

obtain a video stream of a game desktop, wherein the video stream comprises video streams synchronously acquired from a plurality of views of the game desktop;

detect a specific target object for each of image frames comprised in the video stream; and in response to detecting the specific target object in at least one image frame in the video stream, switch a game progress stage at a time point corresponding to a first image frame in a plurality of continuous image frames where the specific target object is detected, wherein the game progress is switched by:

determining the first image frame in the plurality of the continuous image frames where the specific target object is detected in a video stream from one view;

determining a synchronous image acquired synchronously with the first image frame in a video stream synchronously acquired from another view; and in response to detecting the specific target object in at least one image frame of N image frames acquired before the synchronous image, switching the game progress stage at a time point corresponding to an image frame where the specific target object is detected earliest in the N image frames acquired before the synchronous image.

11. The apparatus according to claim 10, the processor is further configured to:

in response to not detecting the specific target object in the N image frames acquired before the synchronous image, switch the game progress stage at the time point corresponding to the first image frame.

12. The apparatus according to claim 10, wherein the plurality of the views comprises:

a side view and a top view, wherein the side view comprises a left side view of the game desktop and/or a right side view of the game desktop.

13. The apparatus according to claim 10, wherein detecting the specific target object for each of the image frames comprised in the video stream comprises:

for each image frame in the video stream, inputting the image frame into a neural network for target object detection to obtain a detection result, wherein the detection result indicates whether each of the image frames comprises the specific target object.

14. The apparatus according to claim 10, wherein the specific target object comprises at least one of a person, a game chip, a game card, or a game currency.

15. The apparatus according to claim 10, wherein the specific target object comprises a game card, and switching the game progress stage at the time point corresponding to the first image frame in the plurality of the continuous image frames where the specific target object is detected comprises:

switching the game progress stage from a betting stage to a gaming stage at the time point corresponding to the first image frame in the plurality of the continuous image frames where the game card is detected.

16. The apparatus according to claim 15, the processor is further configured to:

provide a prompt of stopping betting after switching from the betting stage to the gaming stage.

17. The apparatus according to claim 15, the processor is further configured to:

in response to detecting a change in a betting chip in image frames of the gaming stage in the video stream, determine that the changed betting chip is an invalid betting chip and issuing warning information.

* * * * *